(12) United States Patent
Zhou

(10) Patent No.: US 9,137,334 B2
(45) Date of Patent: Sep. 15, 2015

(54) INTERCONNECTION METHOD, APPARATUS, AND SYSTEM BASED ON SOCKET REMOTE INVOCATION

(71) Applicant: Huawei Technologies Co., Ltd., Shenzhen (CN)

(72) Inventor: Riming Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/143,433

(22) Filed: Dec. 30, 2013

(65) Prior Publication Data

US 2014/0115047 A1    Apr. 24, 2014

Related U.S. Application Data

(63) Continuation of application No. PCT/CN2012/085060, filed on Nov. 22, 2012.

(30) Foreign Application Priority Data

Dec. 13, 2011 (CN) .......................... 2011 1 0415004

(51) Int. Cl.
  *G06F 15/16* (2006.01)
  *H04L 29/06* (2006.01)
  *H04L 29/08* (2006.01)
  *H04L 29/12* (2006.01)

(52) U.S. Cl.
  CPC ............ *H04L 67/42* (2013.01); *H04L 61/2592* (2013.01); *H04L 69/162* (2013.01); *H04L 69/30* (2013.01)

(58) Field of Classification Search
  None
  See application file for complete search history.

(56) References Cited

U.S. PATENT DOCUMENTS

| 7,117,267 | B2 * | 10/2006 | Bavadekar | 709/230 |
| 8,954,590 | B2 * | 2/2015 | Marchev et al. | 709/227 |
| 2005/0198308 | A1 * | 9/2005 | Hoyland et al. | 709/227 |
| 2005/0273846 | A1 * | 12/2005 | Hawkins et al. | 726/11 |

(Continued)

FOREIGN PATENT DOCUMENTS

| CN | 101159657 A | 4/2008 |
| CN | 101540770 A | 9/2009 |

OTHER PUBLICATIONS

Foreign Communication From a Related Counterpart Application, International Application No. PCT/CN2012/085060, International Search Report dated Feb. 28, 2013, 8 pages.

(Continued)

*Primary Examiner* — Joshua Joo
(74) *Attorney, Agent, or Firm* — Conley Rose, P.C.; Grant Rodolph

(57) ABSTRACT

An interconnection method, apparatus, and system where a remote Socket invocation client component obtains information about a first socket application programming interface Socket application programming interface (API) function invoked by a service client; encapsulates the information about the first Socket API function to a message structure; and sends the message structure, so that a remote Socket invocation server executes a second Socket API function corresponding to the first Socket API function in the message structure. The interconnection method, apparatus, and system solve the problem of an interconnection on a public network between the service client on a first local area network and a service server on a second local area network.

17 Claims, 8 Drawing Sheets

(56) References Cited

U.S. PATENT DOCUMENTS

2008/0155103 A1  6/2008  Bailey
2009/0240819 A1  9/2009  Kikkawa et al.

OTHER PUBLICATIONS

Foreign Communication From a Related Counterpart Application, International Application No. PCT/CN2012/085060, Written Opinion dated Feb. 28, 2013, 8 pages.

Luotonen, A., et al., "Tunneling TCP based protocols through Web proxy servers," draft-luotonen-web-proxy-tunneling-01.txt, Aug. 1998, 9 pages.

Wahby, R., "Net::HTTPTunnel—Create sockets that are tunnels through an HTTP 1.1 proxy—search.cpan.org," Retrieved from the Internet: URL: https://web.archive.org/web/20090207092521/http://search.cpan.org/"rwahby/Net-HTTPTunnel-0.51/HTTPTunnel.pm, Feb. 7, 2009, 3 pages.

Foreign Communication From a Counterpart Application, European Application No. 12857411.8, Extended European Search Report dated Jan. 16, 2015, 9 pages.

Foreign Communication From a Counterpart Application, Chinese Application No. 201110415004.2, Chinese Office Action dated Mar. 30, 2015, 8 pages.

* cited by examiner

| | |
|---|---|
| Service client | Application layer |
| Socket API | Transport layer |
| Operating system | |
| Virtual network adapter | Network layer |
| Physical network adapter | Data-link layer |
| | Physical layer |

FIG. 1

INTERCONNECTION METHOD, APPARATUS, AND SYSTEM BASED ON SOCKET REMOTE INVOCATION

CROSS-REFERENCE TO RELATED APPLICATIONS

This application is a continuation of International Application No. PCT/CN2012/085060, filed on Nov. 22, 2012, which claims priority to Chinese Patent Application No. 201110415004.2, filed on Dec. 13, 2011, both of which are hereby incorporated by reference in their entireties.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to the field of communications technologies, and in particular, to an interconnection method, apparatus, and system.

BACKGROUND OF THE INVENTION

Two machines are connected by using a switch device, to implement mutual access of more than two machines, that is, a local area network is formed. In the local area network, because the number of machines is small, it is very easy to configure an Internet Protocol (IP) address of each machine, and a conflict occurs rarely. In the local area network, the two machines may directly access each other according to the IP address.

A public network is a global-based, cross-country, or cross-province network. In the public network, a large number of machines are running. If each machine needs to occupy one IP address, a large number of IP address resources are consumed.

Currently, a network address translation (NAT) technology is generally used, to implement support for accessing a public network by a large number of the machines in a case of limited IP resources.

For a source machine and a destination machine for sending and receiving an IP packet, a certain mapping relationship exists between their system layers and a Transmission Control Protocol (TCP)/IP protocol. For example, a physical network adapter correspondingly processes a data-link layer and a physical layer; an operating system is used to process a transport layer and a network layer; the operating system also provides a Socket application programming interface (API) for a service client to develop a specific application protocol; the service client corresponds to an application layer protocol.

The Socket API is a group of functions provided by the operating system for an application program to develop a network application.

In the prior art, a virtual network adapter technology is generally used to implement an interconnection on the public network between the service client on one local area network and a service server on another local area network. The virtual network adapter technology loads an IP packet hook at an operating system layer of a client and a server, and after hooking the IP packet with a specific destination address, sends the IP packet through a tunnel. The virtual network adapter technology adds, between the operating system and the physical network adapter, a virtual network adapter layer, which is used to capture the IP packet delivered by the operating system to a network adapter, and convert a specific IP packet, thereby implementing the interconnection between the service client and the service server.

Using the virtual network adapter technology may implement the interconnection on the public network between the service client on one local area network and the service server on another local area network. However, this technology has the following technical defects.

1. A virtual network adapter is a process that runs in a kernel, a software conflict is severe, and compatibility and stability of a system are not good.

2. When a fault occurs, a serious problem such as a machine blue screen of death is caused.

3. An underlying logic of the operating system is changed, which is easily recognized as a virus by antivirus software.

4. Virtual network adapter technologies for multiple operating systems (Linux, MAC, iOS, and so on) need to be developed.

For the defects of the prior art, the present invention provides a local area network traversal technical solution based on Socket remote invocation, to implement that the service client remotely invokes Socket within a server local area network and communicates with the server as if within the same local area network.

SUMMARY OF THE INVENTION

Embodiments of the present invention provide an interconnection method, apparatus, and system, and may implement an interconnection between a service client on one local area network and a service server on another local area network.

According to one aspect, an embodiment of the present invention provides an interconnection method, including: obtaining information about a first socket application programming interface Socket API function invoked by a service client, encapsulating the information about the first Socket API function to a message structure, and sending the message structure, so that a remote Socket invocation server executes a second Socket API function corresponding to the first Socket API function in the message structure.

According to another aspect, an embodiment of the present invention provides an interconnection apparatus, including: an obtaining unit configured to obtain information about a first socket application programming interface Socket API function invoked by a service client, an encapsulating unit configured to encapsulate the information about the first Socket API function to a message structure, and a sending unit configured to send the message structure, so that a remote Socket invocation server executes a second Socket API function corresponding to the first Socket API function in the message structure.

According to still another aspect, an embodiment of the present invention provides an interconnection system, where the system includes the foregoing interconnection apparatus, remote Socket invocation server, service client, and service server; the remote Socket invocation server executes a second Socket API function corresponding to a first Socket API function in a message structure sent by the interconnection apparatus, so that the service client that has the interconnection apparatus on a first local area network interconnect on a public network with the service server on a second local area network, where the remote Socket invocation server is on the second local area network, and the second local area network is on the public network.

An embodiment of the present invention provides an interconnection method, apparatus, and system, where, an Hypertext Transfer Protocol (HTTP) tunnel and a Socket connection are established between a remote Socket invocation client component and a remote Socket invocation server, to implement an interconnection between the remote Socket invocation client component and the remote Socket invocation server; and because the remote Socket invocation client component is a component on a service client and the remote Socket invocation server runs within a service server network, therefore the interconnection is implemented between the service client on a local area network and the service server that is on the same local area network as the remote Socket invocation server. A remote Socket invocation client and the remote Socket invocation server implement remote Socket invocation based on an application layer. An operating system and a network characteristic are not changed, attention to a network protocol is not required, and implementation is very simple.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 1 is a schematic diagram of a mapping relationship between a host hierarchy and a network hierarchy in a virtual network adapter technology;

DETAILED DESCRIPTION OF THE EMBODIMENTS

FIG. 1 is a schematic diagram of a mapping relationship between a host hierarchy and a network hierarchy in a virtual network adapter technology. As shown in FIG. 1, the virtual network adapter technology is implemented in an operating system, and a virtual network adapter is added between the operating system and a physical network adapter. The virtual network adapter is used to capture an IP packet delivered by the operating system to the physical network adapter, and convert a specific IP packet.

Figure 2:
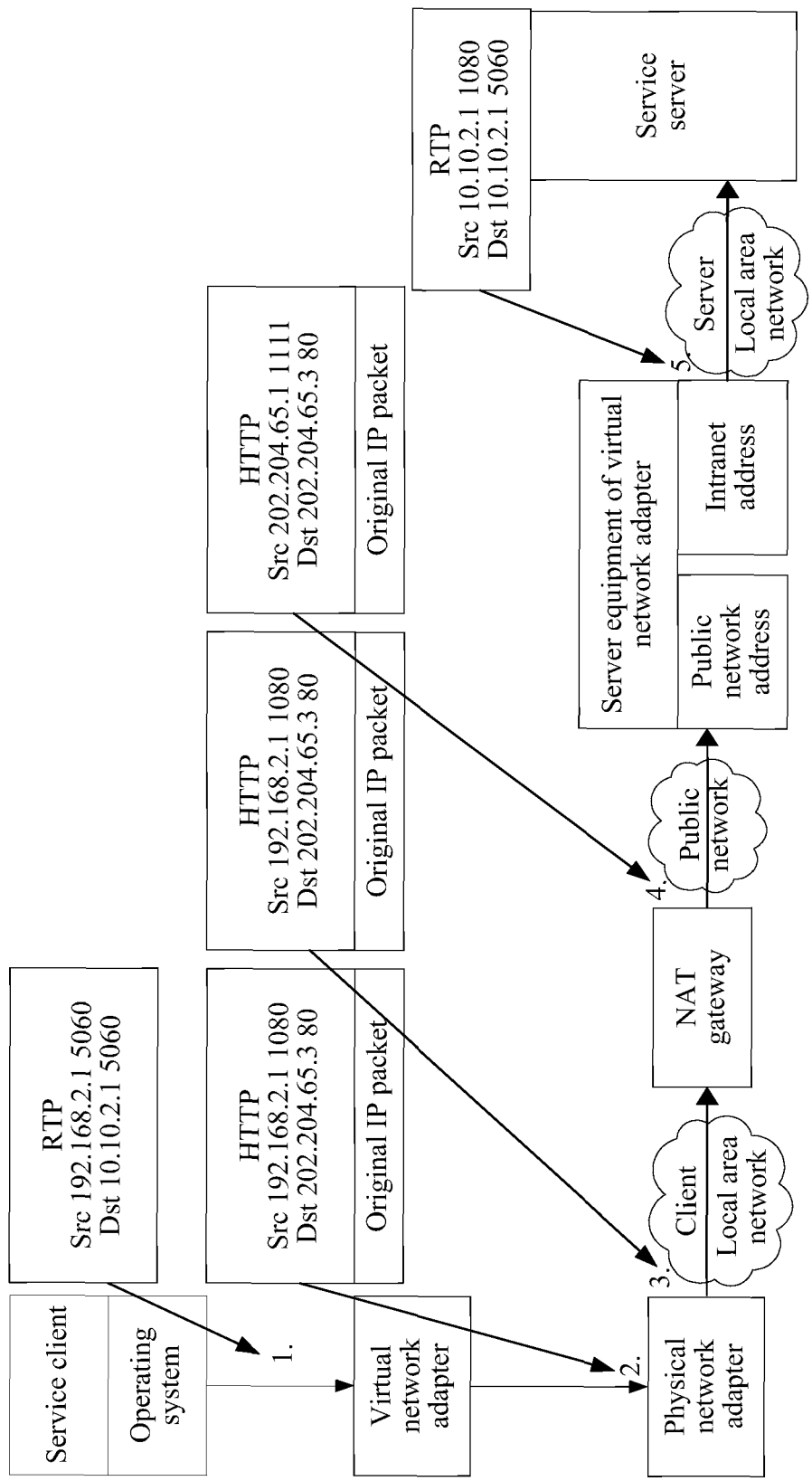
FIG. 2 is a schematic diagram of an implementation principle of an interconnection between a service client and a service server in a virtual network adapter technology.

FIG. 2 is a schematic diagram of an implementation principle of an interconnection between a service client and a service server in a virtual network adapter technology. As shown in FIG. 2:

Step 1: When the service client invokes an operating system to send a Real-Time Transport Protocol (RTP) packet, the operating system packages the RTP packet into an IP packet.

When the operating system sends the IP packet to a physical network adapter, the IP packet is captured by the virtual network adapter. The virtual network adapter constructs a new IP packet (it may be an HTTP packet at an application layer), and puts information about the original IP packet into the HTTP packet. A destination address of the new IP packet is a public address (202.204.65.3) of a virtual network adapter server.

Step 2: The virtual network adapter invokes the physical network adapter to send the new IP packet to a network.

Step 3: The physical network adapter routes the new IP packet to an NAT gateway by using a local area network.

Step 4: The NAT gateway modifies a source address and a source port of the new IP packet, so as to receive the IP packet delivered by the virtual network adapter server.

Step 5: When receiving one HTTP packet, the virtual network adapter server extracts the original IP packet that the HTTP packet bears, modifies a source IP address and port of the original IP packet, modifies them to an intranet address and port (10.10.2.1 1080) of the virtual network adapter server itself, and then sends the IP packet to the service server.

When the service server returns the IP packet, the IP packet is returned through a channel.

By using the virtual network adapter technology, when the NAT gateway is used, the number of NAT port resources occupied by the service client may be reduced; a problem of an Session Initiation Protocol (SIP) failing to correctly negotiate when the NAT gateway is used to implement an interconnection between the local area network and the public network may also be solved; the problem of a service client behind a firewall connecting to a public server may further be solved. However, a virtual network adapter manner has the following technical defects.

1. The virtual network adapter is a process that runs in a kernel, a software conflict is severe, and compatibility and stability of a system are not good.

2. When a fault occurs, a serious problem such as a machine blue screen of death is caused.

3. An underlying logic of the operating system is changed, and it is easily recognized as a virus by antivirus software.

4. Virtual network adapter technologies for the multiple operating systems (Linux, MAC, and iOS, and so on) need to be developed.

For the defects of the prior art, embodiments of the present invention provide an interconnection method, apparatus, and system; where, an HTTP tunnel and a Socket connection are established between a remote Socket invocation client component and a remote Socket invocation server, to implement an interconnection between the remote Socket invocation client component and the remote Socket invocation server; and because the remote Socket invocation client component is a component on a service client and the remote Socket invocation server runs on the local area network where a service server is located, therefore the interconnection on the public network is implemented between the service client that has the remote Socket invocation server on a first local area network and the service server on a second local area network, where the remote Socket invocation server is on the second local area network, and the second local area network is on the public network. A remote Socket invocation client and the remote Socket invocation server implement remote Socket invocation based on an application layer. An operating system and a network characteristic are not changed, attention to a network protocol is not required, and implementation is very simple.

The following further describes technical solutions of the present invention in detail by using accompanying figures and embodiments.

Figure 3:
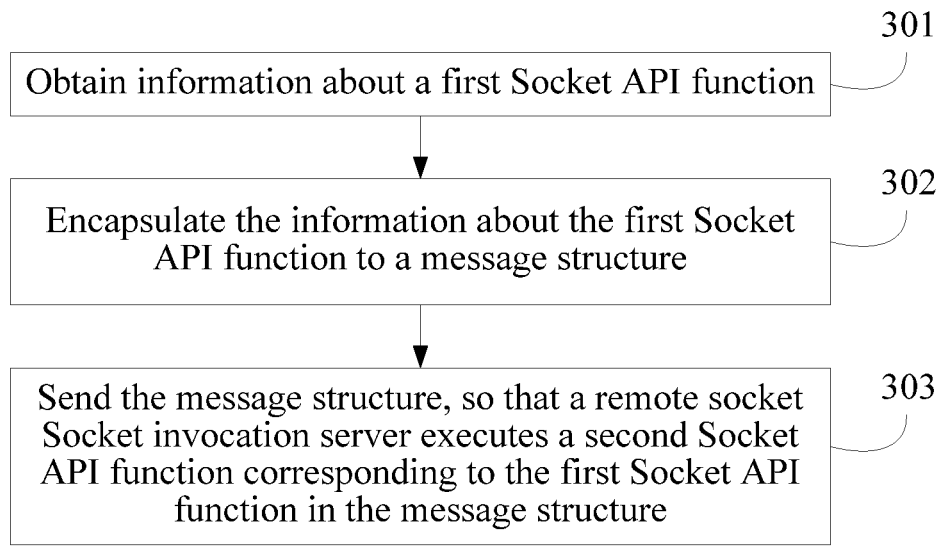
FIG. 3 is a flowchart of an interconnection method according to Embodiment 1 of the present invention.

FIG. 3 is a flowchart of an interconnection method according to Embodiment 1 of the present invention. As shown in FIG. 3, this embodiment includes the following steps.

Step 301: A remote Socket invocation client component obtains information about a first Socket API function invoked by a service client.

The service client invokes a Socket API function in the remote Socket invocation client component.

Preferably, when the service client starts, the service client may initialize the remote Socket invocation client component. When starting, the remote Socket invocation client component initiates an HTTP tunnel establishment connection to a remote Socket invocation server device address, which is configured in advance, of a server side. The remote Socket invocation client component and a remote Socket invocation server perform transfer of network data through the HTTP tunnel.

Preferably, the Socket API function may be a function for establishing a Socket connection; or a function for obtaining an idle IP address and port of a local area network where the remote Socket invocation server is located; or a function for associating a source IP address, a source port, a destination IP address, and a destination port with the Socket connection, where the source IP address and the source port are the idle IP address and port.

It should be noted that, the destination address and the destination port may be an IP address and a port configured in advance by the service client.

Preferably, the Socket API function may also be a function for performing network data interaction by using the Socket connection; or a function for configuring or obtaining a parameter of the Socket connection; or a function for closing the Socket connection.

Step 302: The remote Socket invocation client component encapsulates the information about the first Socket API function to a message structure.

Preferably, the remote Socket invocation client component encapsulates information about a Socket API function invoked by an application layer to an internal message structure. All the information about the Socket API function is included in the message structure. The information includes: a function name, a source IP address, a source port, a destination IP address, a destination port, and message content.

Preferably, a set of data structures are defined between the remote Socket invocation client component and the remote Socket invocation server, and the function name and the function parameter of a Socket API are encapsulated in these structures, to transfer function information of a service client invocation Socket API. A structure of the data structure is as follows:

| Channel ID | Length | Type | Data |
|---|---|---|---|
| 2 bytes | 11 bits | 5 bits | A maximum of 2048 bytes |

A Channel ID corresponds to a Socket connection, and describes an identifier of a Socket connection between a remote Socket invocation client and a remote Socket invocation server. The Channel ID supports a maximum of 65536 Socket connections, equal to the number of ports. A length of the Channel ID is 2 bytes. When a service client and a service server perform network data interaction by using a Socket connection, because an identifier of the Socket connection is already associated with a source IP address, a source port, a destination IP address, and a destination port, therefore if the Channel ID is carried, that is, equivalently, the source IP address, the source port, the destination IP address, and the destination port are carried.

It should be noted that, the Socket API function for performing the network data interaction may be: a send( ) function, a sendto( ) function, a recv( ) function, a recvfrom( ) function, and a select( ) function.

A Length indicates the length of encapsulated data of a Socket API function, and may describe a maximum of 2048 bytes. The length of the Length is 11 bits.

A Type indicates an enumerated value of a name of a function. The length of the Type is 5 bits. The Type may indicate 32 operations. Currently, 18 operations may be used, as follows:

```
enum Type
{
SOCKET=0,
BIND=1,
LISTEN=2,
ACCEPT=3,
CONNECT=4,
CLOSE=5,
SHUTDOWN=6,
RECV=7,
RECVFROM=8,
SEND=9,
SENDTO=10,
TCPSEND=11,
SETSOCKOPT=12,
GETSOCKOPT=13,
GETSOCKNAME=14,
GETPEERNAME=15,
GETHOSTBYNAME=16,
IOCTL=17,
GETIPANDPORT=18
}
```

A Data indicates content of encapsulated data of a function. The length of the Data is a maximum of 2048 bytes.

For example, when the service client invokes a tc_send( ) function in the remote Socket invocation client component, the remote Socket invocation client component encapsulates the function to the following message structure:

| Channel ID | Length | Type | Data |
|---|---|---|---|
| 11012 | 3 | 9 | AAA |

Where, 11012 is an identifier of a Socket connection; 3 is the length of a Data part, that is, the length of "AAA"; 9 is an enumerated value of the send( ) function; AAA is message content sent by the send( ) function.

Step 303: The remote Socket invocation client component sends the message structure, so that a remote Socket invocation server executes a second Socket API function corresponding to the first Socket API function in the message structure.

It should be noted that, the first Socket API function is a function of the service client, and the second Socket API function is a function corresponding to the first Socket API function of the service client and in a service server. A functionality implemented by the first Socket API function is the same as that implemented by the second Socket API function, and parameters are the same.

Preferably, the remote Socket invocation client component packages the message structure into a first HTTP packet, invokes a Socket API in an operating system to send the first HTTP packet; the Socket API uses the first HTTP packet to generate a first IP packet; the operating system invokes a physical network adapter, to send the first IP packet to an NAT gateway; the NAT gateway modifies a source address and a source port of the first IP packet to an IP address of a public network of the NAT gateway and a new port, and generates a second IP packet; the second IP packet is routed by using the public network and arrives at a public network address of the remote Socket invocation server.

Preferably, the remote Socket invocation server unpacks the second IP packet received on the public network, and decapsulates the message structure encapsulated by the remote Socket invocation client component, to obtain the information about the Socket API function that the service client originally wants to invoke.

The remote Socket invocation server invokes the Socket API function that the service client wants to invoke, and invokes a local operating system, to generate a third IP packet and sends the third IP packet to the service server. The service server returns a return value to the service client by using the remote Socket invocation server. The remote Socket invocation server encapsulates content to be returned to a message structure, and returns the message structure to the service client by using the HTTP tunnel.

Figure 4:
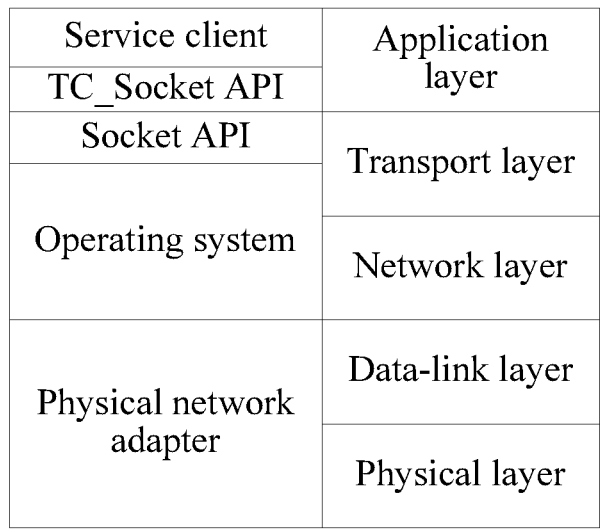
FIG. 4 is a schematic diagram of a mapping relationship between a host hierarchy and a network hierarchy in a remote Socket technology according to an embodiment of the present invention.

Preferably, the embodiment of the present invention adds a Transmission Control (TC)_Socket API layer between the service client and the operating system, to encapsulate the Socket API. A schematic diagram of a mapping relationship between a host hierarchy and a network hierarchy of the service client is shown in FIG. 4:

The service client and the TC_Socket API layer correspond to an application protocol.

The operating system is used to process a transport layer and a network layer, and the operating system provides a Socket API interface at the same time, for the service client to develop a specific application protocol.

A physical network adapter correspondingly processes a data-link layer and a physical layer.

Preferably, the first Socket API function in step 301 is specifically: the Socket API function for establishing the Socket connection; or a Socket API function for obtaining an idle IP address and port of a local area network where the remote Socket invocation server is located; or a Socket API function for associating a source IP address, a source port, a destination IP address, and a destination port with the Socket connection established by the remote Socket invocation server, where the source IP address and the source port are the idle IP address and port of the local area network where the remote Socket invocation server is located, and the destination IP address and the destination port are an IP address and a port of the service server that is on the same local area network as the remote Socket invocation server; or the function for performing network data interaction by using the Socket connection established by the remote Socket invocation server, where a source IP address and a source port of the Socket connection are the IP address and port of the local area network where the remote Socket invocation server is located, and a destination IP address and a destination port of the Socket connection are the IP address and port of the service server that is on the same local area network as the remote Socket invocation server.

The method further includes, receiving a return value returned for executing the second Socket API function by the remote Socket invocation server, and sending the return value to the service client. When the first Socket API function is specifically the Socket API function for establishing the Socket connection, the return value includes a Socket connection identifier of the Socket connection established by the remote Socket invocation server by executing the second Socket API function corresponding to the first Socket API function; when the first Socket API function is specifically the Socket API function for obtaining the idle IP address and port of the local area network where the remote Socket invocation server is located, the return value includes the idle IP address and port of the local area network where the remote Socket invocation server is located, which are obtained by the remote Socket invocation server by executing the second Socket API function corresponding to the first Socket API function; when the first Socket API function is specifically the function for receiving network data by using the Socket connection, the return value includes the network data received from the service server and received by the remote Socket invocation server by executing the second Socket API function corresponding to the first Socket API function.

The following provides an example implementation manner.

A remote Socket invocation client obtains a first establishing function invoked by a service client, where the first establishing function is a Socket API function for establishing a Socket connection; encapsulates information about the first establishing function to a first message structure; sends the first message structure to a remote Socket invocation server, so that the remote Socket invocation server executes a second establishing function corresponding to the first establishing function in the first message structure to establish the Socket connection; and receives a Socket connection identifier of the Socket connection returned by the remote Socket invocation server, and sends the Socket connection identifier to the service client.

The first message structure may include a Channel ID field and a Type field, where, what the Channel ID field records may be an identifier generated by the remote Socket invocation client; what the Type field records may be an enumerated value of a name of the first establishing function; for example, if an enumeration item "SOCKET=0" is defined for the first establishing function in an enumeration type definition, then a Type records 0 here, and of course, may directly record the name of the first establishing function.

After executing the second establishing function to establish the Socket connection, the remote Socket invocation server returns the Socket connection identifier (Socket ID) of the Socket connection to the remote Socket invocation client, and may further record an association relationship between the Channel ID and the Socket ID. After receiving the Socket ID, the remote Socket invocation client returns the Socket ID to the service client. Preferably, the remote Socket invocation client may further record the association relationship between the Channel ID and the Socket ID.

The remote Socket invocation client obtains a first obtaining function invoked by the service client, where the first obtaining function is a Socket API function for obtaining an idle IP address and port of a local area network where the remote Socket invocation server is located; encapsulates information about the first obtaining function to a second message structure; sends the second message structure to the remote Socket invocation server, so that the remote Socket invocation server executes a second obtaining function corresponding to the first obtaining function in the second message structure to obtain the idle IP address and port of the local area network where the remote Socket invocation server is located; and receives the idle IP address and port, which is returned by the remote Socket invocation server, of the local area network where the remote Socket invocation server is located, and sends the idle IP address and port to the service client.

The second message structure may include the Channel ID field and the Type field, where, what the Channel ID field records may be the Channel ID in the first message structure, or empty. What the Type records may be an enumerated value of a name of the first obtaining function; for example, if an enumeration item "GETIPANDPORT=18" is defined for the first obtaining function in the enumeration type definition, then the Type records 18 here, and of course, may directly record the name of the first obtaining function.

The remote Socket invocation client obtains a first associating function invoked by the service client, where the first associating function is a function for associating a source IP address, a source port, a destination IP address, and a destination port with the Socket connection identified by the Socket connection identifier, where the source IP address and the source port are the returned IP address and port, and the destination IP address and the destination port are an IP address and a port of a service server that is on the same local area network as the remote Socket invocation server; encapsulates information about the first associating function to a third message structure; and sends the third message structure to the remote Socket invocation server, so that the remote Socket invocation server executes a second associating function corresponding to the first associating function in the third message structure to associate the source IP address, the source port, the destination IP address, and the destination port with the Socket connection.

The first associating function includes the Socket ID, and the third message structure may include a Channel ID field, a Type field, and a Data field, where, what the Channel ID field records may be the Channel ID in the first message structure, and may also be the Socket ID read from the first associating function. If what is recorded is the Channel ID, the remote Socket invocation client uses the recorded association relationship between the Channel ID and the Socket ID to obtain the Channel ID associated with the Socket ID in the first associating function; what the Type field records is an enumerated value of a name of the first associating function, for example, if an enumeration item "BIND=1" is defined for the first associating function in the enumeration type definition, then the Type field records 1 here, and of course, may directly record the name of the first associating function; the source IP address, the source port, the destination IP address, and the destination port may be included in the Data field.

If what the Channel ID records is the Channel ID in the first message structure, the remote Socket invocation server may use the recorded association relationship between the Channel ID and the Socket ID to obtain the Socket ID associated with the Channel ID in the first message structure, and execute the second associating function to associate the source IP address, the source port, the destination IP address, and the destination port with the Socket connection identified by the Socket ID.

The remote Socket invocation client obtains a first transferring function invoked by the service client, where the first transferring function is a function for performing network data interaction by using the Socket connection identified by the Socket connection identifier; encapsulates information about the first transferring function to a fourth message structure; and sends the fourth message structure to the remote Socket invocation server, so that the remote Socket invocation server executes a second transferring function corresponding to the first transferring function in the fourth message structure to perform the network data interaction with the service server by using the Socket connection.

The first transferring function includes the Socket ID, and the fourth message structure may include a Channel ID field and a Type field, where, what the Channel ID field records may be the Channel ID in the first message structure, and may also be the Socket ID read from the first transferring function. If what is recorded is the Channel ID, the remote Socket invocation client uses the recorded association relationship between the Channel ID and the Socket ID to obtain the Channel ID associated with the Socket ID in the first transferring function; what the Type field records is an enumerated value of a name of the first transferring function, for example, if the first transferring function is a send function, and an enumeration item "SEND=9" is defined for the send function in the enumeration type definition, then the Type records 9 here, and of course, may directly record the name of the first transferring function.

Specifically, the first transferring function may be a function for sending network data by using the Socket connection, the first transferring function further includes the network data, and accordingly, the encapsulated fourth message structure also includes the network data. The remote Socket invocation client sends the fourth message structure to the remote Socket invocation server, so that the remote Socket invocation server executes the second transferring function corresponding to the first transferring function in the fourth message structure to send the network data to the service server by using the Socket connection. The fourth message structure may further include a Data field, and may carry the network data in the Data field.

Specifically, the first transferring function may further be a function for receiving network data by using the Socket connection; the remote Socket invocation client sends the fourth message structure to the remote Socket invocation server, so that the remote Socket invocation server executes the second transferring function corresponding to the first transferring function in the fourth message structure to receive the network data from the service server by using the Socket connection, receives the network data received by the remote Socket invocation server by executing the second transferring function and sends the network data to the service client.

Preferably, before the foregoing steps are performed, the remote Socket invocation client initiates an HTTP tunnel establishment connection to the remote Socket invocation server, and establishes an HTTP tunnel; then, when the foregoing steps are performed, the first message structure, the second message structure, the third message structure, and the fourth message structure are sent through the HTTP tunnel. The remote Socket invocation client may further receive data returned by the remote Socket invocation server through the HTTP tunnel, such as, the Socket connection identifier, the idle IP address and port of the local area network where the remote Socket invocation server is located, and the network data is received by the remote Socket invocation server by executing the second transferring function.

It should be noted that, the foregoing steps may be performed in other orders or at the same time. For example, the remote Socket invocation client may also first obtain the first obtaining function, encapsulate the first obtaining function to the second message structure and send the second message structure, and then obtain the first establishing function, encapsulate the first establishing function to the first message structure and send the first message structure.

Figure 5:
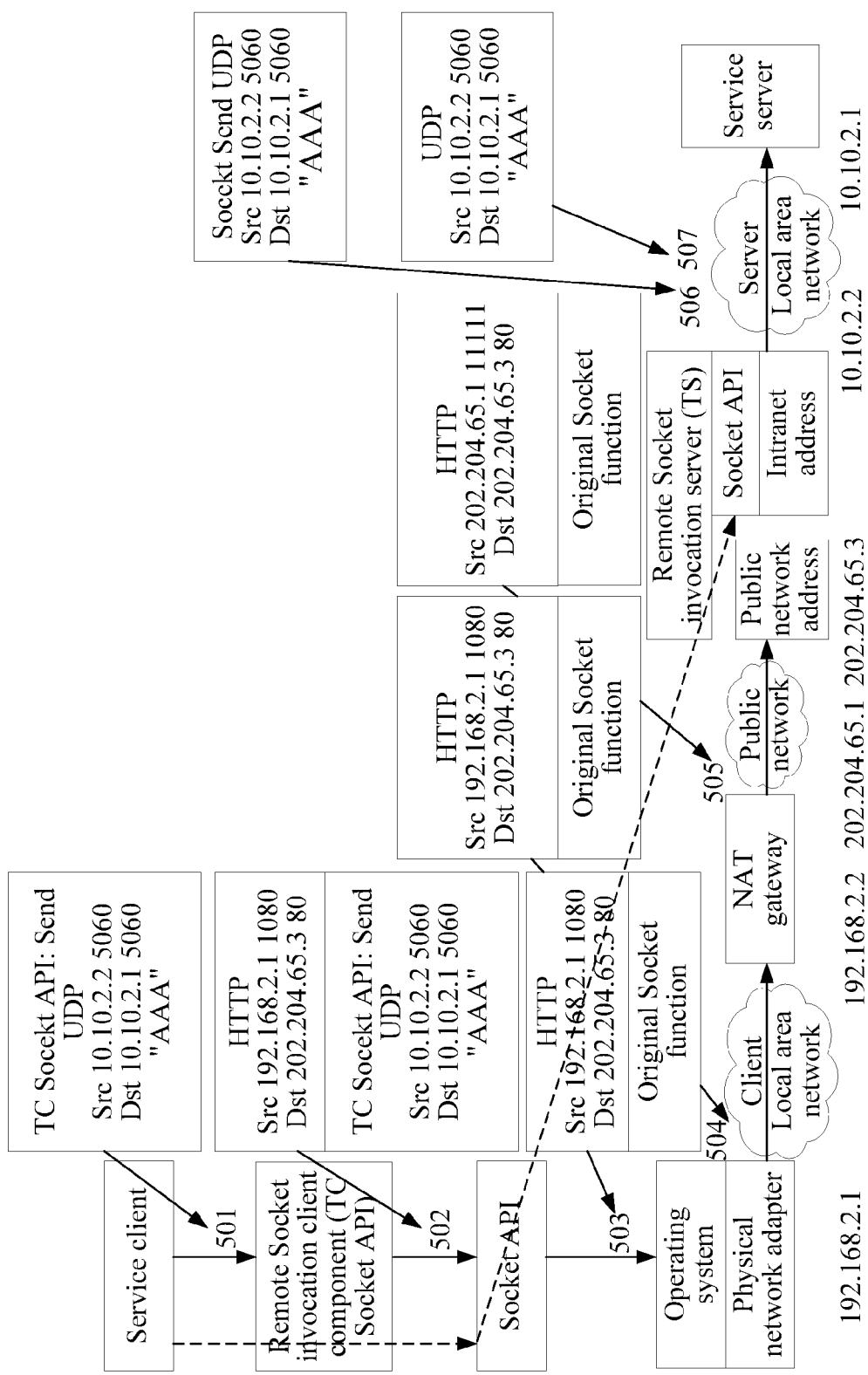
FIG. 5 is a flowchart of an implementation principle of an interconnection according to Embodiment 2 of the present invention.

FIG. 5 is a flowchart of an implementation principle of an interconnection according to Embodiment 2 of the present invention. As shown in FIG. 5, this embodiment of the present invention includes the following steps.

Step 501: A service client sends a User Datagram Protocol (UDP) packet, where a source address of the UDP packet is 10.10.2.2, and a source port is 5060; a destination address is 10.10.2.1, a destination port is 5060, and data is "AAA".

It should be noted that, the destination address and the destination port may be an IP address and a port configured in advance by the service client.

Preferably, the source address of the UDP packet is not a local IP address of the service client, but the IP address of a server side, that is, an intranet IP address of a remote Socket invocation server.

Preferably, when the service client starts, the service client may initialize a remote Socket invocation client component. When starting, the remote Socket invocation client component initiates an HTTP tunnel establishment connection to a remote Socket invocation server device address, which is configured in advance, of a server. The remote Socket invocation client component and the remote Socket invocation server performs transfer of network data through the HTTP tunnel.

Preferably, the service client may invoke a function for establishing a Socket connection to establish the Socket connection; invoke a Socket API function to obtain an idle IP address and port of a local area network where the remote Socket invocation server is located; use the idle IP address and port as a source address and a source port; and invoke a function for associating the source address, the source port, a destination address, and a destination port with the Socket connection.

Step 502: The remote Socket invocation client component encapsulates a Socket API function invoked by an application layer to an internal message structure, and includes all information about the function in the message structure. The information includes the source address 10.10.2.2, the source port 5060, the destination address 10.10.2.1, the destination port 5060, and message content "AAA". Then, the remote Socket invocation client component packages the message structure into a first HTTP packet.

Step 503: The remote Socket invocation client component invokes a Socket API in an operating system, and uses the packaged first HTTP packet to generate a first IP packet.

The Socket API invokes a functionality of the operating system, and uses the first HTTP packet to generate the first IP packet. The first IP packet includes an IP address and port of a client, and an IP address and port of a server. In FIG. 5, a source address of the client is 192.168.2.1, and a source port is 1080; a public network address of the server is 202.204.65.3, and a destination port is 80.

Step 504: The operating system invokes a physical network adapter, and sends the first IP packet to an NAT gateway by using a local area network.

Step 505: The NAT gateway modifies a source address and port of the first IP packet, and routes a second IP packet after modification to a public network address of the remote Socket invocation server by using the public network.

The NAT gateway has two network IP addresses. One is an IP address of an external network, that is, an IP address of the public network; the other is an internal IP address, that is, an IP address of the local area network.

The NAT gateway, after receiving the first IP packet sent by the local area network, modifies the IP address 192.168.2.1 of the local area network to the IP address 202.204.65.1 of the public network of the NAT gateway, and modifies the port 1080 to a new port 11111.

The second IP packet, after the modification, does not have information about the local area network, and may be completely routed on the public network. The NAT gateway routes the second IP packet to a destination host by using the public network. When sending the second IP packet, the NAT gateway records a piece of information inside the NAT gateway at the same time to record a mapping relationship between 202.204.65.1 11111 and 192.168.2.1 1080.

Step 506: The remote Socket invocation server unpacks the second IP packet received on the public network, to obtain the message structure encapsulated by the remote Socket invocation client component, and decapsulates the message structure, to obtain a name (Send) and parameter information (the source address 10.10.2.2, the source port 5060, the destination address 10.10.2.1, the destination port 5060, and the message content "AAA") of the Socket API function that the service client originally wants to invoke.

Step 507: The remote Socket invocation server invokes the Socket API in a local operating system, generates a third IP packet, where the third IP packet includes the source IP address 10.10.2.2, the source port 5060, the destination IP address 10.10.2.1, the destination port, and the message content "AAA", and sends the third IP packet to a service server corresponding to the destination IP address 10.10.2.1.

Figure 6:
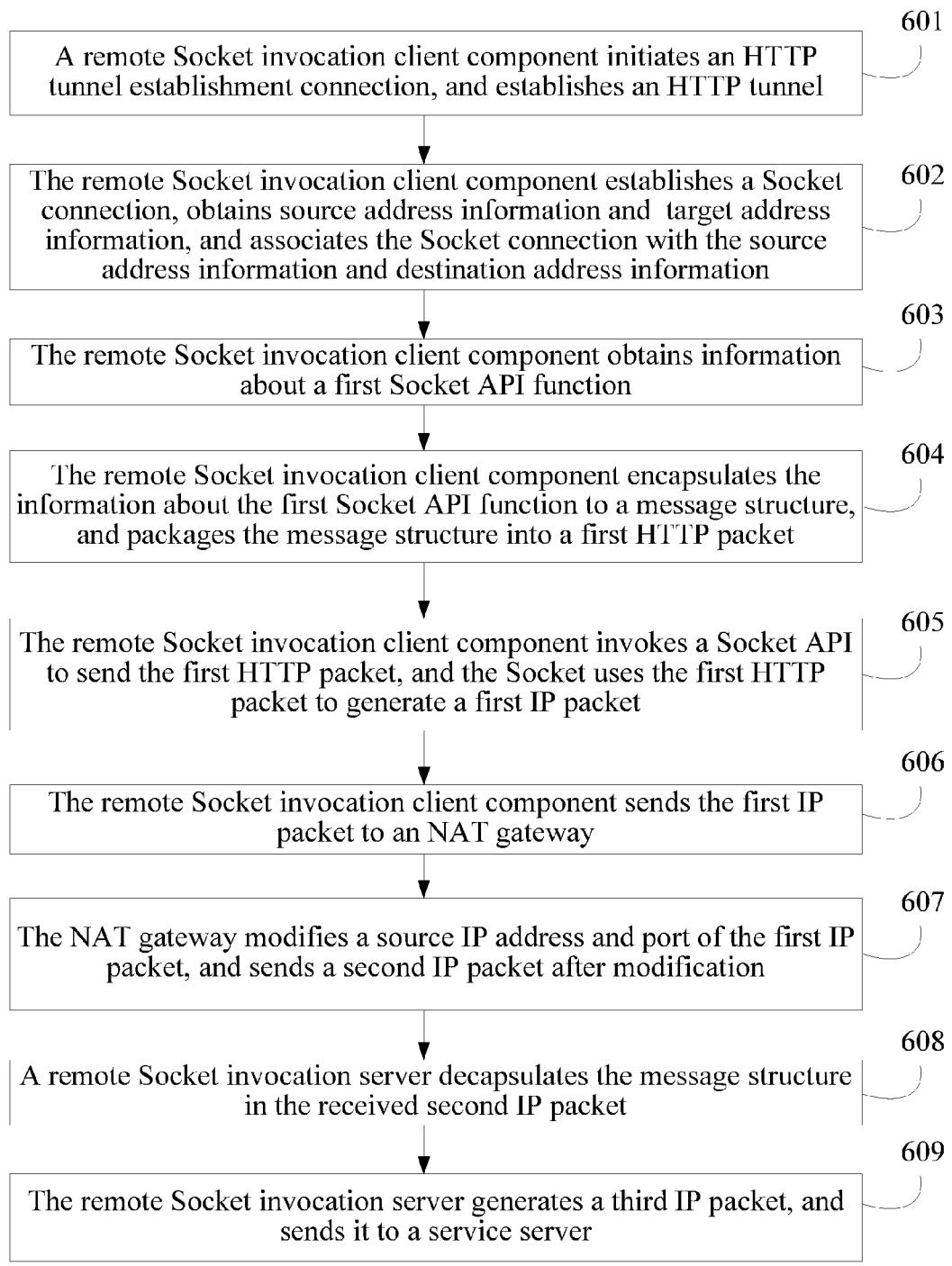
FIG. 6 is a flowchart of an interconnection method according to Embodiment 3 of the present invention.

FIG. 6 is a flowchart of an interconnection method according to Embodiment 3 of the present invention. As shown in FIG. 6, this embodiment includes the following steps:

Step 601: A remote Socket invocation client component initiates an HTTP tunnel establishment connection, and establishes an HTTP tunnel.

A service client, when starting, first initializes the remote Socket invocation client component. The remote Socket invocation client component, when starting, initiates a connection for establishing an HTTP tunnel to a remote Socket invocation server address, which is configured in advance, of a server, and establishes the HTTP tunnel between the remote Socket invocation client component and the remote Socket invocation server.

Step 602: The service client invokes a tc_socket( ) method of the remote Socket invocation client component, and establishes a Socket connection on a network of the remote Socket invocation server.

The service client invokes a method tc_socket( ) of the remote Socket invocation client component, and establishes a Socket connection, where an identifier of the Socket connection is associated with information such as a source IP address, a source port, a destination IP address, and a destination port.

Step 603: The remote Socket invocation client component obtains information about a first Socket API function invoked by the service client.

The service client sends data by invoking a TC_Socket API interface of the remote Socket invocation client component, where content of the data to be sent is included in the first Socket API function.

Step 604: The remote Socket invocation client component encapsulates the information about the first Socket API function to a message structure.

The remote Socket invocation client component encapsulates all the information about the first Socket API function to be invoked by the service client to a message structure. The information includes: the source IP address, the source port, the destination IP address, the destination port, and message content. Then the message structure is packaged into a first HTTP packet.

Step 605: The remote Socket invocation client component invokes a Socket API to send the first HTTP packet, and the Socket API uses the HTTP packet to generate a first IP packet.

The Socket API invokes a functionality of an operating system, and uses the first HTTP packet to generate the first IP packet. The first IP packet includes an IP address and port of a client, and an IP address and port of a server.

Step 606: The operating system invokes a physical network adapter, and sends the first IP packet to an NAT gateway by using a local area network.

Step 607: The NAT gateway modifies a source IP address and port of the first IP packet, and sends a second IP packet after modification.

The NAT gateway, after receiving the first IP packet sent by the local area network, modifies an IP address of the local area network to an IP address of a public network of the NAT gateway, and modifies a port to an idle port on the public network. In this way, the second IP packet does not include information of the local area network, and may be completely routed on the public network.

Step 608: The remote Socket invocation server decapsulates the message structure in the received second IP packet.

The remote Socket invocation server unpacks the second IP packet received on the public network, to obtain the message structure encapsulated by the remote Socket invocation client component, and decapsulates the message structure, to obtain a name and parameter information of a Socket API function that the service client originally wants to invoke.

Step 609: The remote Socket invocation server invokes a local Socket API function to generate a third IP packet, and sends it to a service server.

The remote Socket invocation server invokes the Socket API in a local operating system, generates the third IP packet, and sends the IP packet to the corresponding service server according to information about the destination IP address and port in the third IP packet.

Figure 7:
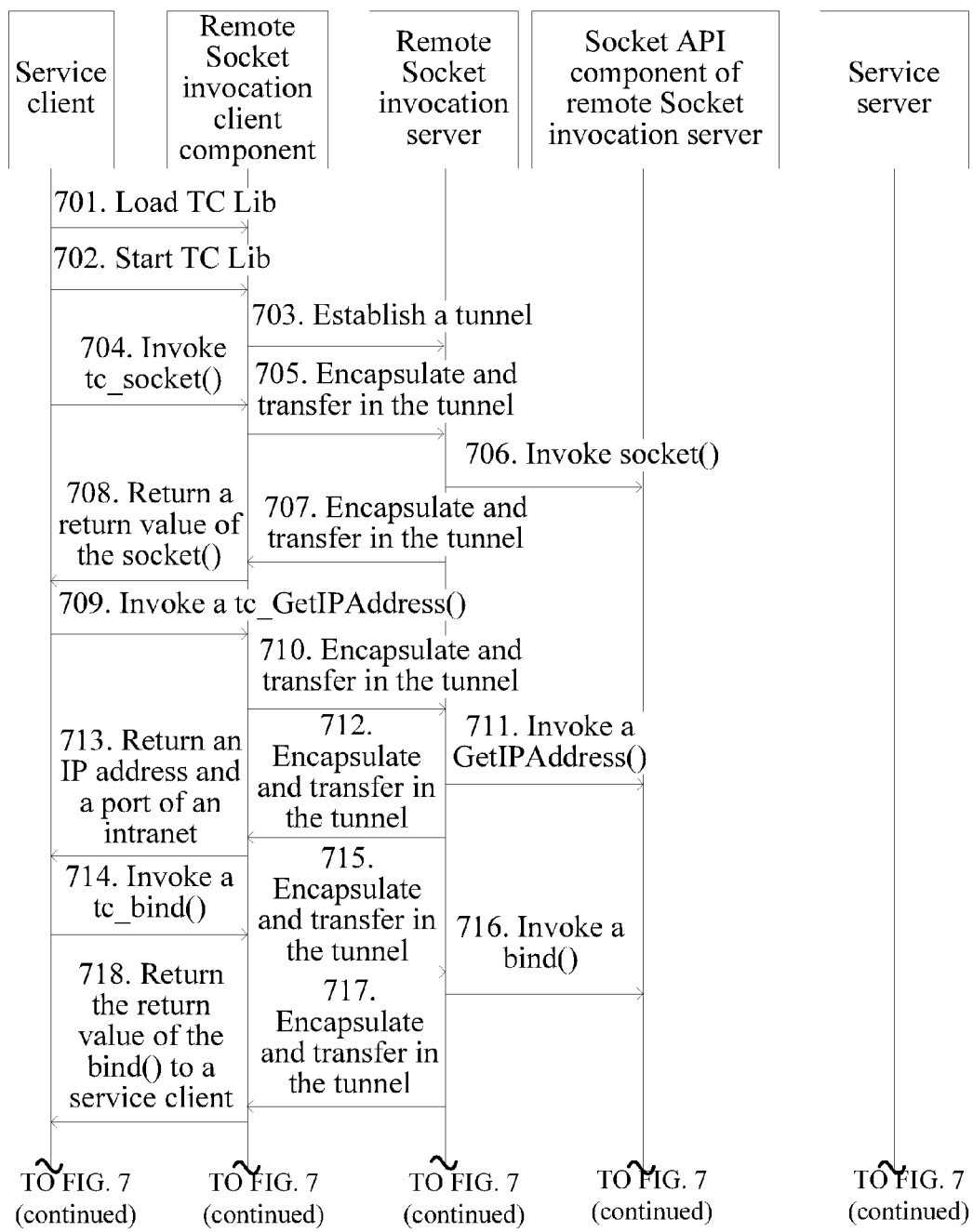
FIG. 7 is a schematic diagram of an entire remote Socket invocation process according to Embodiment 4 of the present invention.
Figure 7:
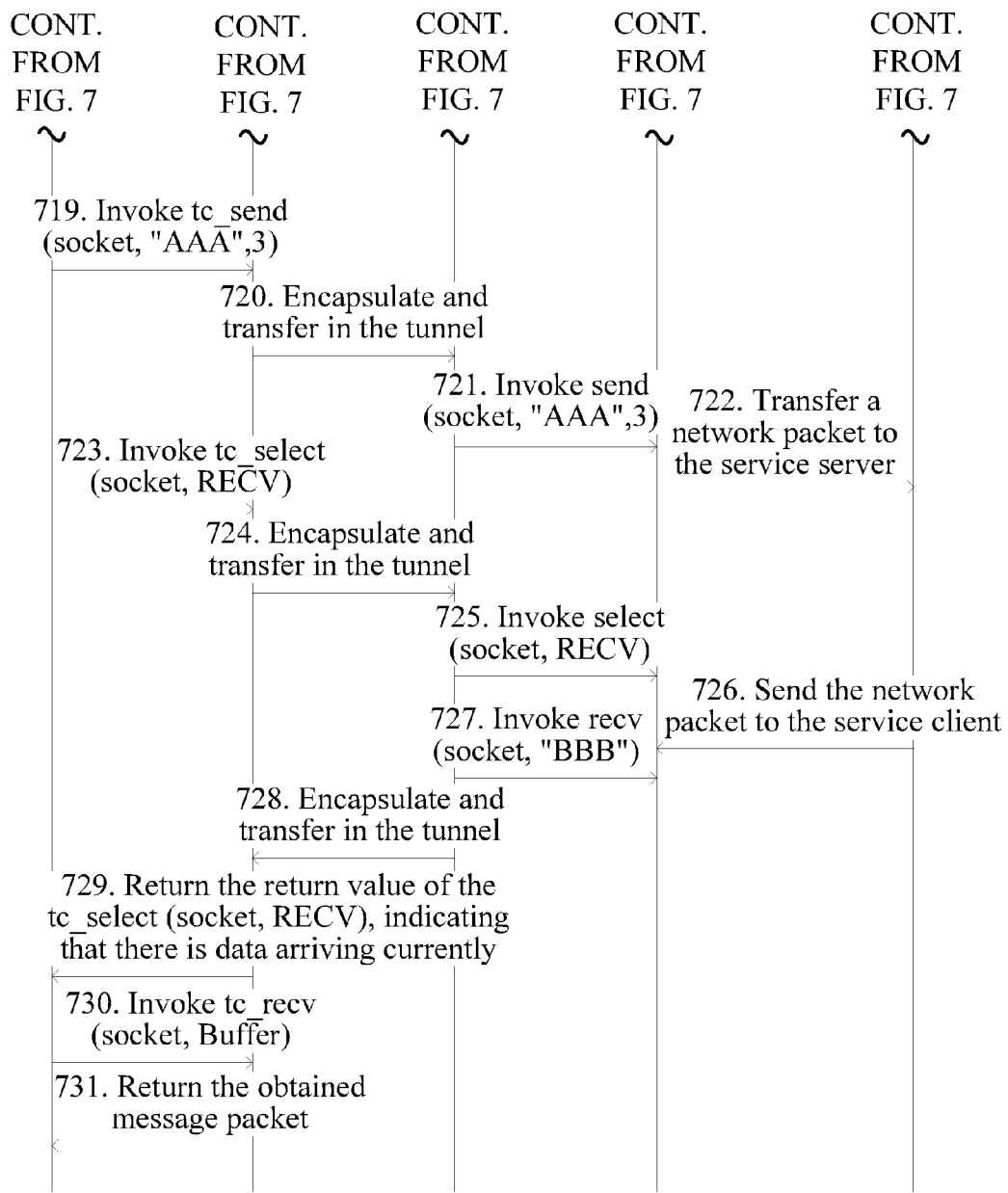

FIG. 7 is a schematic diagram of an entire remote Socket invocation process according to Embodiment 4 of the present invention. As shown in FIG. 7, this embodiment includes the following steps:

Step 701: When a service client starts, the service client loads and initializes a remote Socket invocation client component.

Step 702: Start the remote Socket invocation client component.

Step 703: The remote Socket invocation client component, when starting, initiates a connection for establishing an HTTP tunnel to a remote Socket invocation server address, which is configured in advance, of a server.

Step 701 to step 703 are a process of establishing a tunnel.

Step 704: The service client invokes a method tc_socket( ) of a remote Socket invocation client component, and establishes a Socket connection inside a network of the remote Socket invocation server.

Step 705: The remote Socket invocation client component encapsulates a function name and a parameter of tc_socket( ) to a message structure, and transfers the message structure to the remote Socket invocation server through the HTTP tunnel.

Step 706: The remote Socket invocation server decapsulates the message structure in a packet received on a public network, restores the message structure to an invocation of the local end, and obtains a return value of the Socket connection.

Step 707: The remote Socket invocation server encapsulates a result of invoking a socket( ) function to a message structure, and returns the message structure to the remote Socket invocation client component through the HTTP tunnel.

Step 708: The remote Socket invocation client component decapsulates the received message structure, and returns the result returned by the remote Socket invocation server to the service client by using the return value of tc_socket( ). The service client obtains a returned result of tc_socket( ), that is, obtains the returned result of remotely invoking socket( ).

Step 704 to step 708 are a process of establishing the Socket connection.

Step 709: The service client invokes a method tc_GetIPAddress( ) of the remote Socket invocation client component.

Step 710: The remote Socket invocation client component encapsulates a function name and a parameter of tc_GetIPAddress( ) to a message structure, and transfers the message structure to the remote Socket invocation server through the HTTP tunnel.

Step 711: The remote Socket invocation server decapsulates the message structure in the packet received on the public network, restores the message structure to the invocation of a local function GetIPAddress( ), and obtains a local idle IP address and port.

Step 712: The remote Socket invocation server encapsulates the obtained idle IP address and port as a return value of the function GetIPAddress( ) to a message structure, and returns the message structure to the remote Socket invocation client component through the HTTP tunnel.

Step 713: The remote Socket invocation client component decapsulates the received message structure, and returns a result returned by the remote Socket invocation server to the service client by using the return value of tc_GetIPAddress( ). The service client obtains a returned result of tc_GetIPAddress( ), that is, obtains an IP address and port returned by the remote Socket invocation server. The service client uses the IP address as a source IP address, and uses the port as a source port.

Step 709 to step 713 are a process of obtaining the source IP address and port of the service client.

Step 714: The service client invokes a function tc_bind( ) of the remote Socket invocation client component, and binds the source IP address, the source port, a destination IP address, and a destination port to the Socket connection established in step 704 to step 708.

Step 715: The remote Socket invocation client component encapsulates a function name and a parameter of tc_bind( ) to a message structure, and transfers the message structure to the remote Socket invocation server through the HTTP tunnel.

Step 716: The remote Socket invocation server decapsulates the message structure in the packet received on the public network, restores the message structure to the invocation of a local function bind( ), and associates the source IP address, the source port, the destination IP address, and the destination port with a Socket identifier.

Step 717: The remote Socket invocation server encapsulates a return value of the bind( ) function to a message structure, and returns the message structure to the remote Socket invocation client component through the HTTP tunnel.

Step 718: The remote Socket invocation client component decapsulates the received message structure, and returns the return value of the bind( ) function to the service client.

Step 714 to step 718 are a process of binding the Socket connection to the source IP address, the source port, the destination IP address, and the destination port.

Step 719: The service client invokes a tc_send( ) function in the remote Socket invocation client component, and sends network data to a service server.

Step 720: The remote Socket invocation client component encapsulates the tc_send( ) function to a message structure, and transfers the message structure to the remote Socket invocation server through the HTTP tunnel.

Step 721: The remote Socket invocation server decapsulates the message structure in the packet received on the public network, and restores the message structure to the invocation of a local function send( ).

Step 722: The remote Socket invocation server sends the network data to the service server.

The service server, after receiving the data, returns, to the service client, a result indicating that the data is successfully sent.

Step 719 to step 722 are a process of sending the network data.

Step 723: The service client invokes a tc_select( ) function in the remote Socket invocation client component.

The tc_select( ) function is used to monitor whether data arrives at the Socket connection.

Step 724: The remote Socket invocation client component encapsulates the tc_select( ) function to a message structure, and transfers the message structure to the remote Socket invocation server through the HTTP tunnel.

Step 725: The remote Socket invocation server decapsulates the message structure in the packet received on the public network, and restores the message structure to the invocation of a local function select( ).

Step 726: The service server delivers a network data packet to the service client.

Step 727: The remote Socket invocation server detects that a packet arrives, and invokes a recv( ) function to receive the packet.

Step 728: The remote Socket invocation server encapsulates the received packet to a message structure, and sends the message structure to the remote Socket invocation client component by using an HTTP tunnel connection.

Step 729: The remote Socket invocation client component parses the network data packet from the message structure, and when detecting that the data arrives, sends a message indicating that the data arrives to the service client.

Step 730: The service client learns from a returned result of the tc_select( ) function that a packet arrives, invokes a tc_recv( ) function of the remote Socket invocation client component, and receives the packet.

Step 731: The remote Socket invocation client component returns, in the tc_recv( ) function, the obtained packet to the service client.

Step 723 to step 731 are a process of monitoring and receiving the network data packet returned by the service server.

Figure 8:
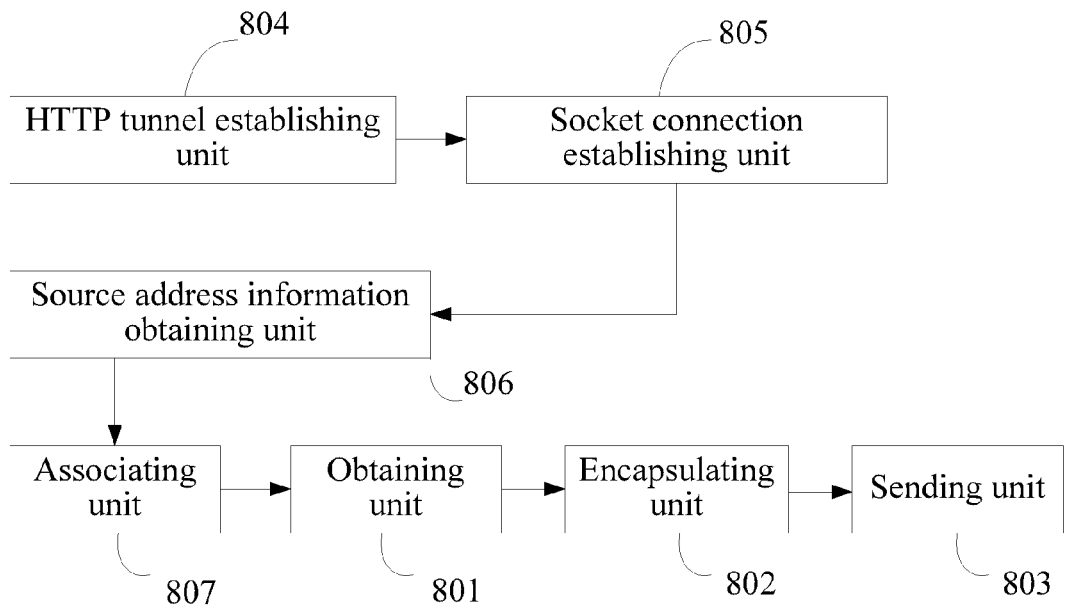
FIG. 8 is a schematic diagram of an interconnection apparatus according to Embodiment 5 of the present invention.

FIG. 8 is a schematic diagram of an interconnection apparatus according to Embodiment 5 of the present invention. As shown in FIG. 8, this embodiment includes the following units: an obtaining unit 801 configured to obtain information about a first Socket API function invoked by a service client; preferably, the service client invokes a TC Socket API to send network data, where content of the network data is included in the first Socket API function; the obtaining unit 801 is configured to obtain first Socket API function information that includes the content of the network data; an encapsulating unit 802 configured to encapsulate the information about the first Socket API function to a message structure; preferably, the encapsulating unit 802 encapsulates all the information about the first Socket API function to be invoked by the service client to a message structure; the information includes: a source IP address, a source port, a destination IP address, a destination port, and message content; then the message structure is packaged into a first HTTP packet; and a sending unit 803 configured to send the message structure, so that a remote Socket invocation server executes a second Socket API function corresponding to the first Socket API function in the message structure.

Preferably, the sending unit 803 specifically packages the message structure into a first HTTP packet, and invokes a Socket API in an operating system to send the first HTTP packet; the Socket API uses the first HTTP packet to generate a first IP packet; the operating system invokes a physical network adapter, to send the first IP packet to an NAT gateway; the NAT gateway modifies a source address and a source port of the first IP packet to an IP address of a public network of the NAT gateway and a new port, and generates a second IP packet; and the second IP packet is routed by using the public network, and arrives at a public network address of the remote Socket invocation server.

Preferably, the remote Socket invocation server unpacks the second IP packet received on the public network, to obtain the message structure encapsulated by the remote Socket invocation client component, and decapsulates the message structure, to obtain a name and parameter information of a Socket API function that the service client originally wants to invoke. The remote Socket invocation server invokes a Socket API in a local operating system, generates a third IP packet, and sends the IP packet to a corresponding service server according to information about a destination IP address and port in the third IP packet. The service server, by using the remote Socket invocation server, returns a returned result to the remote Socket invocation client component through an HTTP tunnel.

Optionally, the sending unit is specifically configured to send the message structure to the remote Socket invocation server; the first Socket API function obtained by the obtaining unit may specifically be a Socket API function for performing network data interaction by using a Socket connection established by the remote Socket invocation server, where a source IP address and a source port of the Socket connection are an IP address and a port of a local area network where the remote Socket invocation server is located, and a destination IP address and a destination port of the Socket connection are an IP address and a port of the service server on the same local area network as the remote Socket invocation server.

The function for performing the network data interaction by using the Socket connection established by the remote Socket invocation server may specifically be a function for sending the network data by using the Socket connection, where a first transferring function further includes the network data; may specifically further be a function for receiving the network data by using the Socket connection.

Furthermore, the apparatus further includes a return value receiving unit and a return value sending unit; where the return value receiving unit is specifically configured to receive a return value returned by the remote Socket invocation server for executing the second Socket API function, and the return value sending unit is specifically configured to send the return value received by the return value receiving unit to the service client. When the first Socket API function obtained by the obtaining unit is specifically the function for receiving the network data by using the Socket connection, the return value receiving unit is specifically configured to receive the network data that is returned by the remote Socket invocation server by executing a second Socket API function corresponding to the first Socket API function and that is received from the service server; the return value sending unit is specifically configured to send the network data received by the return value receiving unit to the service client.

Preferably, the apparatus further includes: an HTTP tunnel establishing unit 804 configured to initiate an HTTP tunnel establishment connection to the remote Socket invocation server, and establish an HTTP tunnel.

A remote Socket invocation client component, when starting, sends an HTTP tunnel establishment connection to the remote Socket invocation server, and establishes an HTTP tunnel. The remote Socket invocation client communicates with the remote Socket invocation server through the HTTP tunnel.

Preferably, the apparatus further includes: a Socket connection establishing unit 805 configured to initiate a Socket connection establishment request to the remote Socket invocation server, and establish a Socket connection.

After the HTTP tunnel is established, the service client invokes a tc_socket( ) function of the remote Socket invocation client component, and establishes a Socket connection on the remote Socket invocation server. The remote Socket invocation server returns an identifier of the established Socket connection as a return value to the service client.

Preferably, the apparatus further includes: a source address information obtaining unit 806 configured to obtain an idle IP address and port of a local area network where a remote Socket invocation server is located, and use them as a source IP address and a source port.

The service client, after obtaining the identifier of the Socket connection, invokes a tc_GetIPAddress( ) function of the remote Socket invocation client component, and obtains an idle IP address and port on an intranet of the remote Socket invocation server. The remote Socket invocation server returns the IP address and port to the service client. The service client, when sending a network data packet to a service server, uses the IP address and port as a source IP address and port.

Preferably, the apparatus further includes: an associating unit 807 configured to associate the source IP address, the source port, a destination IP address, and a destination port with the Socket connection.

The service client invokes a function tc_bind( ) of the remote Socket invocation client component, binds the source IP address, the source port, the destination IP address, and the destination port to the established Socket connection, that is, performs association with the identifier of the established Socket connection.

Figure 9:
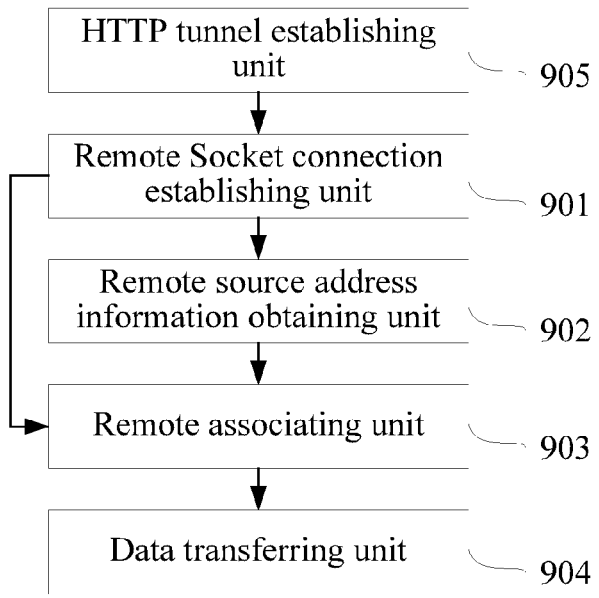
FIG. 9 is a schematic diagram of another apparatus of an interconnection according to Embodiment 6 of the present invention.

FIG. 9 is a schematic diagram of another interconnection apparatus according to Embodiment 6 of the present invention. As shown in FIG. 9, this embodiment includes the following units: a remote Socket connection establishing unit 901 configured to obtain a first establishing function invoked by a service client, where the first establishing function is a Socket API function for establishing a Socket connection; encapsulate information about the first establishing function to a first message structure; send the first message structure to a remote Socket invocation server, so that the remote Socket invocation server executes a second establishing function corresponding to the first establishing function in the first message structure to establish the Socket connection; receive a Socket connection identifier of the Socket connection returned by the remote Socket invocation server, and send the Socket connection identifier to the service client; a remote source address information obtaining unit 902 configured to obtain a first obtaining function invoked by the service client, where the first obtaining function is the Socket API function for obtaining an idle IP address and port of a local area network where the remote Socket invocation server is located; encapsulate information about the first obtaining function to a second message structure; send the second message structure to the remote Socket invocation server, so that the remote Socket invocation server executes a second obtaining function corresponding to the first obtaining function in the second message structure to obtain the idle IP address and port of the local area network where the remote Socket invocation server is located; receive the idle IP address and port of the local area network where the remote Socket invocation server is located, which is returned by the remote Socket invocation server, and send the idle IP address and port to the service client; a remote associating unit 903 configured to obtain a first associating function invoked by the service client, where the first associating function is a function for associating a source IP address, a source port, a destination IP address, and a destination port with the Socket connection identified by the Socket connection identifier received by the remote Socket connection establishing unit, where the source IP address and the source port are the IP address and port obtained by the remote source address information obtaining unit, and the destination IP address and the destination port are an IP address and port of a service server that is on the same local area network as the remote Socket invocation server; encapsulate information about the first associating function to a third message structure; send the third message structure to the remote Socket invocation server, so that the remote Socket invocation server executes a second associating function corresponding to the first associating function in the third message structure to associate the source IP address, the source port, the destination IP address, and the destination port with the Socket connection; and a data transferring unit 904 configured to obtain a first transferring function invoked by the service client, where the first transferring function is the function for performing network data interaction by using the Socket connection identified by the Socket connection identifier; encapsulate information about the first transferring function to a fourth message structure; send the fourth message structure to the remote Socket invocation server, so that the remote Socket invocation server executes a second transferring function corresponding to the first transferring function in the fourth message structure to perform the network data interaction with the service server by using the Socket connection.

Specifically, the first transferring function may be the function for sending the network data by using the Socket connection, and the first transferring function further includes the network data; the data transferring unit is specifically configured to send the fourth message structure to the remote Socket invocation server, so that the remote Socket invocation server executes the second transferring function corresponding to the first transferring function in the fourth message structure to send the network data to the service server by using the Socket connection.

Specifically, the first transferring function may further be the function for receiving the network data by using the Socket connection; the data transferring unit is specifically configured to send the fourth message structure to the remote Socket invocation server, so that the remote Socket invocation server executes the second transferring function corresponding to the first transferring function in the fourth message structure to receive the network data from the service server by using the Socket connection, and the data transferring unit is further configured to receive the network data received by the remote Socket invocation server by executing the second transferring function and send the network data to the service client.

Preferably, the apparatus further includes: an HTTP tunnel establishing unit 905 configured to establish an HTTP tunnel to the remote Socket invocation server. The apparatus communicates with the remote Socket invocation server through the HTTP tunnel. The apparatus may send the first message structure, the second message structure, the third message structure, and the fourth message structure through the HTTP tunnel. The remote Socket invocation server may send a return value (for example, the Socket connection identifier of the established Socket connection) for executing the second establishing function, the second obtaining function (for example, the obtained IP address and port), the second associating function, and a return value (for example, the network data received from the service server) of the second transferring function to the apparatus through the HTTP tunnel.

An embodiment of the present invention provides an interconnection system, where the system includes the interconnection apparatus, the remote Socket invocation server, the service client, and the service server according to Embodiment 5 and Embodiment 6 of the present invention; the remote Socket invocation server executes a second Socket API function corresponding to a first Socket API function in a message structure sent by the interconnection apparatus, so that the service client that has the interconnection apparatus on a first local area network interconnect on a public network with the service server on a second local area network, where the remote Socket invocation server is on the second local area network, and the second local area network is on the public network. The interconnection system provided by the embodiment of the present invention establishes an HTTP tunnel and a Socket connection between a remote Socket invocation client component and the remote Socket invocation server, to implement an interconnection between the remote Socket invocation client component and the remote Socket invocation server; and because the remote Socket invocation client component is a component on the service client and the remote Socket invocation server runs on a service server network, therefore the interconnection is implemented between the service client and the service server, that is, the interconnection is implemented on the public network between the service client on a local area network and the service server that is on the same local area network as the remote Socket invocation server. A remote Socket invocation client and the remote Socket invocation server implement a remote Socket invocation based on an application layer. An operating system and a network characteristic are not changed, attention to a network protocol is not required, and implementation is very simple.

The interconnection method, apparatus, and system provided by the embodiments of the present invention implement the remote Socket invocation based on the application layer. The operating system and the network characteristic are not changed, and the attention to the network protocol is not required. Port resources are saved, and networking complexity is reduced. In addition, the present invention, as a software Secure Sockets Layer (SSL) Virtual Private Network (SVN) solution, may replace hardware SVN equipment. Implementation is simple, and costs are low.

A person skilled in the art may further appreciate that, in combination with the examples described in the embodiments disclosed in this specification, units and algorithm steps may be implemented by electronic hardware, computer software, or a combination thereof. In order to clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The steps of a method or algorithm described in connection with the embodiments disclosed herein may be embodied directly in hardware, in a software module executed by a processor, or in a combination of the two. The software module may be located in a Random Access Memory (RAM), a computer memory, a Read Only Memory (ROM), an Electrically Programmable Read Only Memory (EPROM), an Electrically Erasable Programmable Read Only Memory (EEPROM), a register, a hard disk, a removable disk, a Compact Disk-Read Only Memory (CD-ROM), or any other storage media well-known in the art.

The objectives, technical solutions, and benefits of the present invention are further described in detail in the foregoing specific embodiments. It should be understood that the foregoing descriptions are merely specific embodiments of the present invention, but are not intended to limit the protection scope of the present invention. Any modification, equivalent replacement, or improvement made within the spirit and principle of the present invention shall fall within the protection scope of the present invention.

What is claimed is:

1. An interconnection method, comprising:
   initiating a Hypertext Transfer Protocol (HTTP) tunnel establishment connection to a remote Socket invocation server, and establishing an HTTP tunnel;
   obtaining an information about a first Socket application programming interface (API) function invoked by a service client, wherein the first Socket API function is a Socket API function for performing a network data interaction by using a Socket connection established by the remote Socket invocation server, wherein a source Internet Protocol (IP) address and a source port of the Socket connection are an IP address and a port of a local area network where the remote Socket invocation server is located, and a destination IP address and a destination port of the Socket connection are an IP address and a port of a service server that is on the same local area network as the remote socket invocation server;
   encapsulating the information about the first Socket API function to a message structure; and
   sending the message structure to the remote Socket invocation server through the HTTP tunnel to enable the remote Socket invocation server to execute a second Socket API function corresponding to the first Socket API function in the message structure.

2. The interconnection method according to claim 1, further comprising receiving a return value of the second Socket API function through the HTTP tunnel.

3. The interconnection method according to claim 1, wherein the first Socket API function is further a function for performing a network data interaction by using the Socket connection; or a function for configuring, obtaining a parameter of the Socket connection, or a function for closing the Socket connection.

4. The interconnection method according to claim 1, wherein sending the message structure through the HTTP tunnel comprises:
packaging the message structure into a first HTTP packet;
invoking a Socket API in an operating system to send the first HTTP packet;
using, by the Socket API, the first HTTP packet to generate a first IP packet;
invoking, by the operating system, a physical network adapter to send the first IP packet to a network address translation (NAT) gateway;
modifying, by the NAT gateway, a source address and a source port of the first IP packet to an IP address of a public network and a new port to generate a second IP packet; and
routing the second IP packet through the public network, the second IP packet arriving at a public network address of the remote Socket invocation server.

5. An interconnection method, comprising:
obtaining, by a remote Socket invocation client, a first establishing function invoked by a service client, wherein the first establishing function is a Socket application programming interface (API) function for establishing a Socket connection;
encapsulating an information about the first establishing function to a first message structure;
sending the first message structure to a remote Socket invocation server to enable the remote Socket invocation server to execute a second establishing function corresponding to the first establishing function in the first message structure to establish the Socket connection;
receiving a Socket connection identifier of the Socket connection returned by the remote Socket invocation server;
sending the Socket connection identifier to the service client;
obtaining, by the remote Socket invocation client, a first obtaining function invoked by the service client, wherein the first obtaining function is a Socket API function for obtaining an idle Internet Protocol (IP) address and port of a local area network where the remote Socket invocation server is located;
encapsulating information about the first obtaining function to a second message structure;
sending the second message structure to the remote Socket invocation server to enable the remote Socket invocation server to execute a second obtaining function corresponding to the first obtaining function in the second message structure to obtain the idle IP address and port of the local area network where the remote Socket invocation server is located;
receiving the idle IP address and a port, which are returned by the remote Socket invocation server of the local area network where the remote Socket invocation server is located;
sending the idle IP address and the port to the service client;
obtaining, by the remote Socket invocation client, a first associating function invoked by the service client, wherein the first associating function is a function for associating a source IP address, a source port, a destination IP address, and a destination port with the Socket connection identified by the Socket connection identifier, wherein the source IP address and the source port are the IP address and port returned by the remote Socket invocation server, and the destination IP address and the destination port are an IP address and port of a service server that is on the same local area network as the remote Socket invocation server;
encapsulating information about the first associating function to a third message structure;
sending the third message structure to the remote Socket invocation server to enable the remote Socket invocation server to execute a second associating function corresponding to the first associating function in the third message structure to associate the source IP address, the source port, the destination IP address, and the destination port with the Socket connection;
obtaining, by the remote Socket invocation client, a first transferring function invoked by the service client, wherein the first transferring function is a function for performing network data interaction by using the Socket connection identified by the Socket connection identifier;
encapsulating information about the first transferring function to a fourth message structure; and
sending the fourth message structure to the remote Socket invocation server to enable the remote Socket invocation server to execute a second transferring function corresponding to the first transferring function in the fourth message structure to perform the network data interaction with the service server by using the Socket connection.

6. The interconnection method according to claim 5, wherein the first transferring function is a function for sending network data by using the Socket connection, wherein the first transferring function further comprises the network data, wherein the remote Socket invocation client sends the fourth message structure to the remote Socket invocation server, wherein the remote Socket invocation server executes the second transferring function corresponding to the first transferring function in the fourth message structure to send the network data to the service server by using the Socket connection.

7. The interconnection method according to claim 5, wherein the first transferring function is a function for receiving network data by using the Socket connection, wherein the remote Socket invocation client sends the fourth message structure to the remote Socket invocation server, and wherein the remote Socket invocation server: executes the second transferring function corresponding to the first transferring function in the fourth message structure to receive the network data from the service server by using the Socket connection, and wherein the remote Socket invocation client receives the network data received by the remote Socket invocation server by executing the second transferring function, and sends the network data to the service client.

8. The interconnection method according to claim 5, further comprising: initiating a Hypertext Transfer Protocol (HTTP) tunnel establishment connection to the remote Socket invocation server, establishing an HTTP tunnel and sending, by the remote Socket invocation client, the first message structure, the second message structure, the third message structure, and the fourth message structure through the HTTP tunnel.

9. An interconnection apparatus, comprising:
a processor; and
a non-transitory computer readable medium which contains computer-executable instructions,
wherein the processor is configured to execute the computer-executable instructions to perform operations comprising:
 initiating a Hypertext Transfer Protocol (HTTP) tunnel establishment connection to a remote Socket invocation server and establish an HTTP tunnel;
 obtaining information about a first Socket application programming interface (API) function invoked by a service client, wherein the first Socket API function is a Socket API function for performing a network data interaction by using a Socket connection established by the remote Socket invocation server, where a source Internet Protocol (IP) address and a source port of the Socket connection are an IP address and a port of a local area network where the remote Socket invocation server is located, and a destination IP address and a destination port of the Socket connection are an IP address and a port of a service server that is on the same local area network as the remote Socket invocation server;
 encapsulating the information about the first Socket API function to a message structure; and
 sending the message structure to the remote Socket invocation server through the HTTP tunnel to enable the remote Socket invocation server to execute a second Socket API function corresponding to the first Socket API function in the message structure.

10. The interconnection apparatus according to claim 9, wherein the processor is configured to execute the computer-executable instructions to further perform an operation of initiating a Socket connection establishment request to the remote Socket invocation server and establish a Socket connection.

11. The interconnection apparatus according to claim 10, wherein the processor is configured to execute the computer-executable instructions to further perform an operation of obtaining an idle IP address and a port of the local area network where the remote Socket invocation server is located and use the obtained idle IP address and port as the source IP address and the source port.

12. The interconnection apparatus according to claim 11, wherein the processor is further configured to execute the computer-executable instructions to further perform an operation of associating the source IP address, the source port, the destination IP address, and the destination port with the Socket connection.

13. An interconnection apparatus, comprising:
a processor; and
a non-transitory computer readable medium which contains computer-executable instruction,
wherein the processor is configured to execute the computer-executable instructions to perform operations comprising:
 obtaining a first establishing function invoked by a service client, wherein the first establishing function is a Socket application programming interface (API) function for establishing a Socket connection;
 encapsulating information about the first establishing function to a first message structure;
 sending the first message structure to a remote Socket invocation server to enable the remote Socket invocation server to execute a second establishing function corresponding to the first establishing function in the first message structure to establish the Socket connection;
 receiving a Socket connection identifier of the Socket connection returned by the remote Socket invocation server;
 sending the Socket connection identifier to the service client;
 obtaining a first obtaining function invoked by the service client, wherein the first obtaining function is a Socket API function for obtaining an idle Internet Protocol (IP) address and port of a local area network where the remote Socket invocation server is located;
 encapsulating information about the first obtaining function to a second message structure;
 sending the second message structure to the remote Socket invocation server to enable the remote Socket invocation server to execute a second obtaining function corresponding to the first obtaining function in the second message structure to obtain the idle IP address and port of the local area network where the remote Socket invocation server is located;
 receiving the idle IP address and port, which are returned by the remote Socket invocation server, of the local area network where the remote Socket invocation server is located, and send the idle IP address and port to the service client;
 obtaining a first associating function invoked by the service client, wherein the first associating function is a function for associating a source IP address, a source port, a destination IP address, and a destination port with the Socket connection identified by the Socket connection identifier, wherein the source IP address and the source port are the IP address and port returned by the remote Socket invocation server, and the destination IP address and the destination port are an IP address and port of a service server that is on the same local area network as the remote Socket invocation server;
 encapsulating information about the first associating function to a third message structure;
 sending the third message structure to the remote Socket invocation server to enable the remote Socket invocation server to execute a second associating function corresponding to the first associating function in the third message structure to associate the source IP address, the source port, the destination IP address, and the destination port with the Socket connection;
 obtaining a first transferring function invoked by the service client, wherein the first transferring function is a function for performing network data interaction by using the Socket connection identified by the Socket connection identifier;
 encapsulating information about the first transferring function to a fourth message structure; and
 sending the fourth message structure to the remote Socket invocation server to enable the remote Socket invocation server to execute a second transferring function corresponding to the first transferring function in the fourth message structure to perform the network data interaction with the service server by using the Socket connection.

14. The interconnection apparatus according to claim 13, wherein the first transferring function is a function for sending network data by using the Socket connection, wherein the first transferring function further comprises the network data, wherein the processor is configured to execute the computer-executable instructions to send the fourth message structure to the remote Socket invocation server, and wherein the remote Socket invocation server executes the second transferring function corresponding to the first transferring function in the fourth message structure to send the network data to the service server by using the Socket connection.

15. The interconnection apparatus according to claim 13, wherein the first transferring function is a function for receiving network data by using the Socket connection, the processor is configured to execute the computer-executable instructions to send the fourth message structure to the remote Socket invocation server, wherein the remote Socket invocation server executes the second transferring function corresponding to the first transferring function in the fourth message structure to receive the network data from the service server by using the Socket connection, and wherein the processor is configured to execute the computer-executable instructions to perform further operations comprising: receiving the network data received by the remote Socket invocation server by executing the second transferring function and sending the network data to the service client.

16. The interconnection apparatus according to claim 13, wherein the processor is configured to execute the computer-executable instructions to perform further operationscomprising: establishing a HyperText Transfer Protocol (HTTP) tunnel to the remote Socket invocation server, wherein the first message structure, the second message structure, the third message structure and the fourth message structure are sent through the HTTP tunnel.

17. An interconnection system, comprising:
an interconnection apparatus, a remote Socket invocation server, a service client, and a service server,
wherein the interconnection apparatus comprises:
a processor; and
a non-transitory computer readable medium which contains computer-executable instruction,
wherein the processor is configured to execute the computer-executable instructions to perform operations comprising:
  initiating a Hypertext Transfer Protocol (HTTP) tunnel establishment connection to the remote Socket invocation server and establish an HTTP tunnel, obtain information about a first Socket application programming interface (API) function invoked by the service client;
  encapsulating the information about the first Socket API function to a message structure; and
  sending the message structure to the remote Socket invocation server through the HTTP tunnel to enable the remote Socket invocation server to execute a second Socket API function corresponding to the first Socket API function in the message structure,
wherein the first socket API function is a Socket API function for performing a network data interaction by using a Socket connection established by the remote Socket invocation server,
wherein a source Internet Protocol (IP) address and a source port of the Socket connection are an IP address and a port of a local area network where the remote Socket invocation server is located,
wherein a destination IP address and a destination port of the Socket connection are an IP address and a port of the service server that is on the same local area network as the remote Socket invocation server,
wherein the remote Socket invocation server is configured to execute the second Socket API function corresponding to the first Socket API function in the message structure sent by the interconnection apparatus,
wherein the service client that has the interconnection apparatus on a first local area network interconnect on a public network with the service server on a second local area network,
wherein the remote Socket invocation server is on the second local area network, and
wherein the second local area network is connected to the public network.

* * * * *

UNITED STATES PATENT AND TRADEMARK OFFICE
CERTIFICATE OF CORRECTION

| | | |
|---|---|---|
| PATENT NO. | : 9,137,334 B2 | Page 1 of 1 |
| APPLICATION NO. | : 14/143433 | |
| DATED | : September 15, 2015 | |
| INVENTOR(S) | : Zhou | |

It is certified that error appears in the above-identified patent and that said Letters Patent is hereby corrected as shown below:

On the title page item [30], insert

--Dec. 13, 2011 (CN) ............................ 201110415004.2--

Signed and Sealed this
Fifteenth Day of March, 2016

Michelle K. Lee
*Director of the United States Patent and Trademark Office*